US010713251B2

(12) United States Patent
Weissman et al.

(10) Patent No.: US 10,713,251 B2
(45) Date of Patent: Jul. 14, 2020

(54) PUSHING DATA TO A PLURALITY OF DEVICES IN AN ON-DEMAND SERVICE ENVIRONMENT

(71) Applicant: salesforce.com, inc., San Francisco, CA (US)

(72) Inventors: Craig Weissman, San Francisco, CA (US); William Charles Eidson, Palo Alto, CA (US); Erik Forsberg, Los Angeles, CA (US); Deepak Kothule, Los Angeles, CA (US)

(73) Assignee: salesforce.com, inc., San Francisco, CA (US)

( * ) Notice: Subject to any disclaimer, the term of this patent is extended or adjusted under 35 U.S.C. 154(b) by 36 days.

(21) Appl. No.: 14/953,794

(22) Filed: Nov. 30, 2015

(65) Prior Publication Data
US 2016/0078091 A1 Mar. 17, 2016

Related U.S. Application Data

(63) Continuation of application No. 11/757,087, filed on Jun. 1, 2007, now Pat. No. 9,201,939.

(60) Provisional application No. 60/810,601, filed on Jun. 2, 2006, provisional application No. 60/810,230, filed on Jun. 2, 2006.

(51) Int. Cl.
*G06F 16/2455* (2019.01)
*G06F 16/21* (2019.01)
*G06F 16/22* (2019.01)
*G06F 16/27* (2019.01)
*G06F 16/245* (2019.01)
*G06F 16/248* (2019.01)
(Continued)

(52) U.S. Cl.
CPC .......... *G06F 16/2455* (2019.01); *G06F 16/21* (2019.01); *G06F 16/22* (2019.01); *G06F 16/2358* (2019.01); *G06F 16/245* (2019.01); *G06F 16/248* (2019.01); *G06F 16/24575* (2019.01); *G06F 16/27* (2019.01)

(58) Field of Classification Search
CPC .......... G06F 17/30554; G06F 17/3048; G06F 17/30528; G06F 16/24575; G06F 16/2358
See application file for complete search history.

(56) References Cited

U.S. PATENT DOCUMENTS 5,577,188 A 11/1996 Zhu
5,608,872 A 3/1997 Schwartz
(Continued)

OTHER PUBLICATIONS

U.S. Appl. No. 13/986,251, dated Apr. 16, 2013.
(Continued)

*Primary Examiner* — Marc S Somers
(74) *Attorney, Agent, or Firm* — Dergosits & Noah LLP; Todd A. Noah

(57) ABSTRACT

Mechanisms and methods for pushing data to a plurality of devices of a plurality of organizations are provided. Queries are handled in bulk for a group of users of an organization or the entire organization, and limited results are sent to a middle tier server between the database system and the user devices. These mechanisms and methods for pushing data to a plurality of devices enable an efficient and transparent transfer of data to user devices. This efficient and transparent transfer of data can enable mobile devices of many organizations to seamlessly have the data that is required to perform business.

15 Claims, 8 Drawing Sheets

(51) Int. Cl.
*G06F 16/2457* (2019.01)
*G06F 16/23* (2019.01)

(56) References Cited

U.S. PATENT DOCUMENTS

| | | | |
|---|---|---|---|
| 5,644,725 A * | 7/1997 | Schmerer | G06Q 40/12 |
| | | | 705/28 |
| 5,649,104 A | 7/1997 | Carleton | |
| 5,689,708 A * | 11/1997 | Regnier | G06F 9/468 |
| | | | 709/229 |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,870,759 A * | 2/1999 | Bauer | G06F 17/30578 |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,134,549 A * | 10/2000 | Regnier | G06F 17/3056 |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 * | 2/2001 | Lim | G06F 17/30575 |
| | | | 707/620 |
| 6,216,135 B1 | 4/2001 | Brodersen et al. | |
| 6,226,635 B1 * | 5/2001 | Katariya | G06F 17/30448 |
| 6,233,616 B1 * | 5/2001 | Reid | H04L 29/12009 |
| | | | 709/220 |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,654,766 B1 * | 11/2003 | Degenaro | G06F 12/123 |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,748,386 B1 * | 6/2004 | Li | G06F 17/30876 |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B2 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,403,939 B1 * | 7/2008 | Virdy | G06F 16/24578 |
| | | | 707/718 |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 7,921,299 B1 * | 4/2011 | Anantha | G06F 21/53 |
| | | | 705/51 |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,041,737 B2 * | 10/2011 | Silverman | G06Q 10/10 |
| | | | 705/1.1 |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0087661 A1 * | 7/2002 | Matichuk | B60P 3/34 |
| | | | 709/218 |
| 2002/0107872 A1 * | 8/2002 | Hudis | G06F 17/30557 |
| 2002/0109718 A1 * | 8/2002 | Mansour | G06F 9/4445 |
| | | | 715/744 |
| 2002/0129352 A1 | 9/2002 | Brodersen et al. | |
| 2002/0133504 A1 * | 9/2002 | Vlahos | G06F 17/30566 |
| 2002/0140731 A1 | 10/2002 | Subramanian P et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0095142 A1 * | 5/2003 | Patrizio | G06F 9/4443 |
| | | | 715/744 |
| 2003/0120675 A1 | 6/2003 | Stauber et al. | |
| 2003/0131232 A1 * | 7/2003 | Fraser | G06F 21/6218 |
| | | | 713/156 |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0039742 A1 * | 2/2004 | Barsness | G06F 17/3056 |
| 2004/0093325 A1 * | 5/2004 | Banerjee | G06F 16/9537 |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267620 A1* | 12/2004 | Feldman ............... G06Q 20/12 705/19 |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0108526 A1* | 5/2005 | Robertson ............ G06F 21/6227 713/166 |
| 2005/0223022 A1* | 10/2005 | Weissman ........ G06F 17/30595 |
| 2006/0224692 A1* | 10/2006 | Gupta .............. G06F 17/30451 709/217 |
| 2006/0235714 A1* | 10/2006 | Adinolfi ................ G06Q 40/06 705/1.1 |
| 2007/0100826 A1* | 5/2007 | Mehaffy ........... G06F 17/30368 707/8 |
| 2007/0226439 A1* | 9/2007 | Hasegawa .......... G06F 11/1456 711/162 |
| 2008/0243827 A1* | 10/2008 | Sarma ............... G06F 16/24575 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0005218 A1* | 1/2012 | Rajagopal ......... G06F 17/30654 707/749 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

OTHER PUBLICATIONS

Office Action for co-pending U.S. Appl. No. 11/757,087; dated Mar. 4, 2015.

Office Action for co-pending U.S. Appl. No. 11/757,087; dated Jun. 26, 2014.

Office Action for co-pending U.S. Appl. No. 11/757,087; dated Dec. 19, 2013.

Office Action for co-pending U.S. Appl. No. 11/757,087; dated May 3, 2012.

Office Action for co-pending U.S. Appl. No. 11/757,087; dated Sep. 16, 2011.

Office Action for co-pending U.S. Appl. No. 11/757,087; dated Mar. 31, 2011.

Office Action for co-pending U.S. Appl. No. 11/757,087; dated Feb. 24, 2010.

Office Action for co-pending U.S. Appl. No. 11/757,087; dated Jul. 31, 2009.

Office Action for co-pending U.S. Appl. No. 11/757,087; dated Feb. 3, 2009.

Office Action for co-pending U.S. Appl. No. 11/757,087; dated May 29, 2008.

* cited by examiner

| | (.account) 202 | data 203 | | 209 |
|---|---|---|---|---|
| 201 — Org id | acc id | name | ...... | User ID Ownership |
| ood 1<br>ood 1<br>⋮<br>ood 1 | ood 1<br>ood 2<br>⋮ | Enterprise Constellation | | |
| ood 2<br>ood 2<br>⋮<br>ood 2 | | | | |
| ⋮ | ⋮ | ⋮ | ⋮ | ⋮ |
| oodN<br>oodN | | | | |

(rows grouped as: org #1, org #2, ..., org #N) — table labeled 200

FIG. 3

*Enterprise Application Integration Agent

PUSHING DATA TO A PLURALITY OF DEVICES IN AN ON-DEMAND SERVICE ENVIRONMENT

CLAIM OF PRIORITY

This application is a continuation of U.S. application Ser. No. 11/757,087 filed Jun. 1, 2007, now U.S. Pat. No. 9,201,939.

This application claims priority from U.S. Provisional Patent Application 60/810,601, filed Jun. 2, 2006 and U.S. Provisional Patent Application 60/810,230, filed Jun. 2, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to pushing data to devices in a database network system, and more particularly to pushing data to mobile devices in a multi-tenant database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system in a transparent manner that is easy to understand is desirable.

Unfortunately, conventional database approaches might process a query relatively slowly and become inefficient if, for example, the number of queries received by the database system is relatively high. A database system may also process a query relatively slowly if, for example, a relatively large number of users substantially concurrently access the database system.

Accordingly, it is desirable to provide techniques enabling an efficient pushing of data to a plurality of devices that use the database system.

BRIEF SUMMARY

In accordance with embodiments, there are provided mechanisms and methods for pushing data to a plurality of devices of a plurality of organizations. Queries are handled in bulk for a group of users of an organization or the entire organization. In an embodiment, results are sent to a middle tier server between the database system and the user devices. Results may be sent as updates to a prior result to reduce workload. These mechanisms and methods for pushing data to a plurality of devices enable an efficient and transparent transfer of data to user devices. The ability of embodiments to provide this efficient and transparent transfer of data can enable mobile devices of many organizations to seamlessly obtain the data that users require.

In an embodiment and by way of example, a method for pushing data to a plurality of devices of a plurality of organizations is provided. The method embodiment includes receiving a request for information for a first organization, applying a query to a database to retrieve a result limited to information associated with the first organization, and determining a subset of the result to be returned to the first organization. This determination may be achieved by comparing the result to state information indicating what information is present at a server of the first organization and comparing the result to permission information indicating which portion of the result that devices at the first organization are permitted to view. Limiting the result to information associated with the first organization can enable the database to contain information for a plurality of organizations without compromising security of any particular organization.

In one embodiment, requests to provide regular updates of the data at the server of the first organization are received at periodic intervals. In another embodiment, the subset of the result is sent to the server at the first organization, which enables the server to provide each of the devices with that portion of the result that each of the devices is permitted to view without the device contacting the database. In one embodiment, a scheduled procedure is provided for sending information to a first device by sending the quasi-identical copy of information to the first device in response to the request. Also, an exception procedure is provided for acquiring information by a first device by receiving, at the middle tier server, an exception request which activates a query to the database to return information specific to the first device. In one embodiment, the server may filter the result for information relevant to each mobile device. In another embodiment, the server may send information to render objects at each mobile device, thereby providing a self-describing mobile framework. In another embodiment, the server sends information determined to be related to information already stored at each mobile device.

In one embodiment, the request is received from the server at the first organization. In one embodiment, receiving a request for information for a first organization includes receiving, from a middle tier server, a request to update a quasi-identical copy of information present at each of a plurality of mobile devices of the first organization. In another embodiment, applying the query to the database includes forming a query to a multi-tenant database for information belonging to the first organization. In yet another embodiment, comparing the result to the permission information includes comparing the result to access rules indicating which users in the first organization have access to each portion of the result; and comparing the result to state information includes determining which portions of the result to send to a requesting server to update a quasi-identical copy, stored in the requesting server, of information present at each of a plurality of mobile devices.

In one embodiment, an entire result for the first organization is sent in response to detecting at least one of: a change in rules for the information associated with the first organization, an edit made to a portion of the data, a request for the entire result by the server of the first organization, and a size of the subset of the result being larger than a predetermined amount. In another embodiment, the method further includes receiving a request for a second organization, applying a query to obtain a result for the second organization, and determining a subset to be returned to the second organization.

In another embodiment and by way of example, a machine-readable medium carrying one or more sequences of instructions for pushing data to a plurality of devices at a plurality of organizations is provided. The instructions, when executed by one or more processors, cause the one or more processors carry out the steps of: receiving a request for a first organization, applying a query to obtain a result for the first organization, and determining a subset to be returned to the first organization.

In another embodiment and by way of example, a system including a multi-tenant database, an interface to a server supporting a plurality of mobile devices, and a processor is provided. The processor is coupled with a machine readable memory storing instructions for: receiving a request for a first organization, applying a query to obtain a result for the first organization, and determining a subset to be returned to the first organization.

While the present invention is described with reference to an embodiment in which techniques for pushing data to a plurality of devices in an on-demand service environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 3 illustrates an example of objects represented as a main table according to an embodiment.

DETAILED DESCRIPTION

General Overview

Systems and methods are provided for pushing data to a plurality of devices in an on-demand service environment. These techniques for pushing data can enable embodiments to maintain quasi identical copies of information stored at a multi-tenant database system, for example, at devices constrained by one or more of storage capacity, display size, network limit, any combination thereof or other constraints. Maintaining a quasi identical copy can provide users with a significant portion of the data the user is likely to need to conduct their business without imposing undue burdens on the database system by relieving the need for display or storage or other constrained devices to continuously interrogate the database system for fresh data.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. As used herein, the term limited result refers to a result returned by a database system when a query plan is designed to retrieve only a portion of a result, such as for a result for a specific organization retrieved from a multi-tenant database system for example. As used herein, the term quasi identical copy refers to a copy of information in a database system maintained at a separate device or system to be as close as the device or system is capable of maintaining it subject to constraints placed on the separate device or system. Constraints may include one or any combination of workload constraints on the database system, bandwidth constraints imposed by the connection between the separate device or system and the database system, memory or storage capacity constraints of the separate device or system, display constraints of the separate device or system and other constraints imposed either by design or by happenstance.

Next, mechanisms and methods for providing pushing data to a plurality of devices in an on-demand service environment will be described with reference to example embodiments.

System Overview

Figure 1:
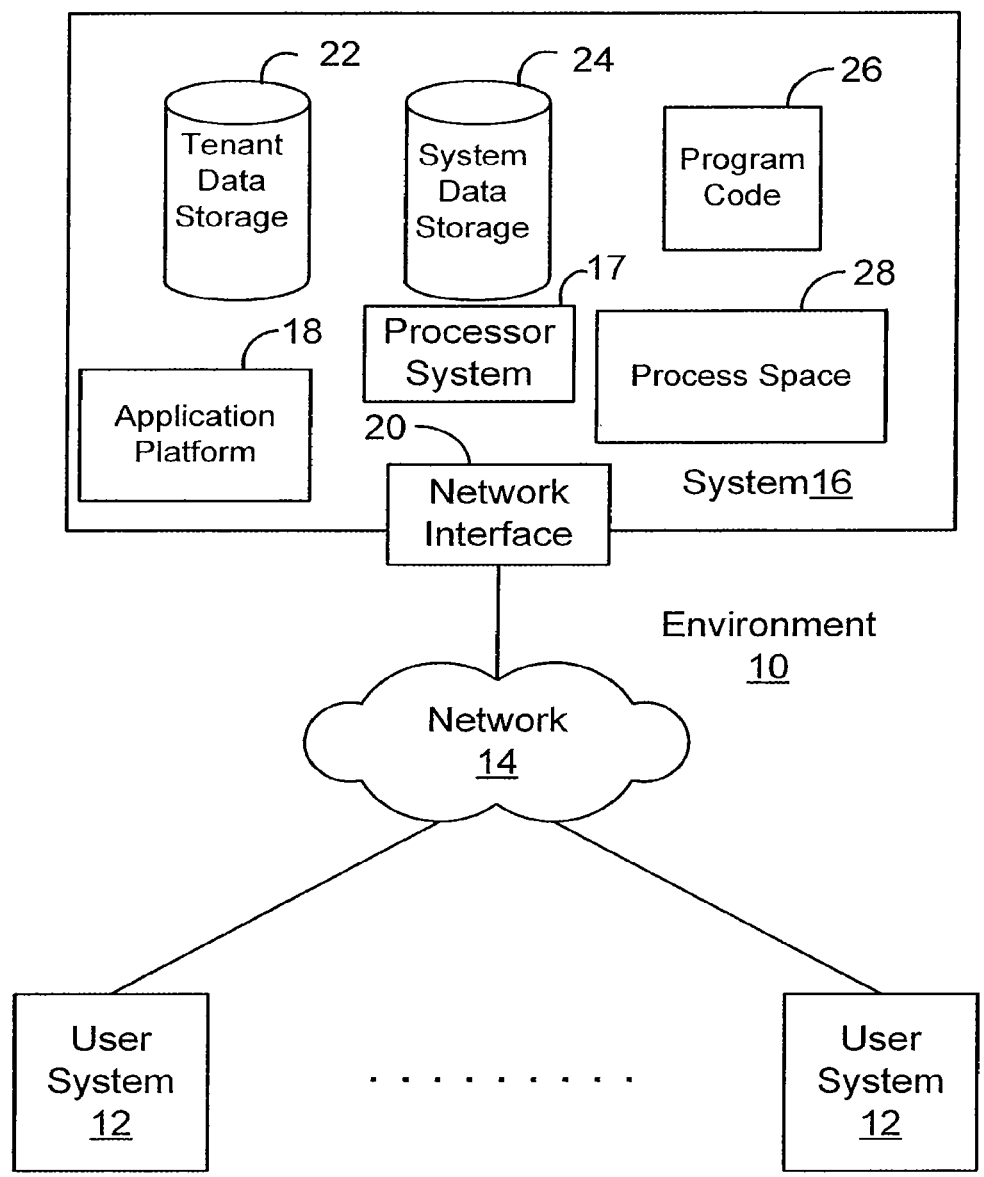
FIG. 1 illustrates a block diagram of an example of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
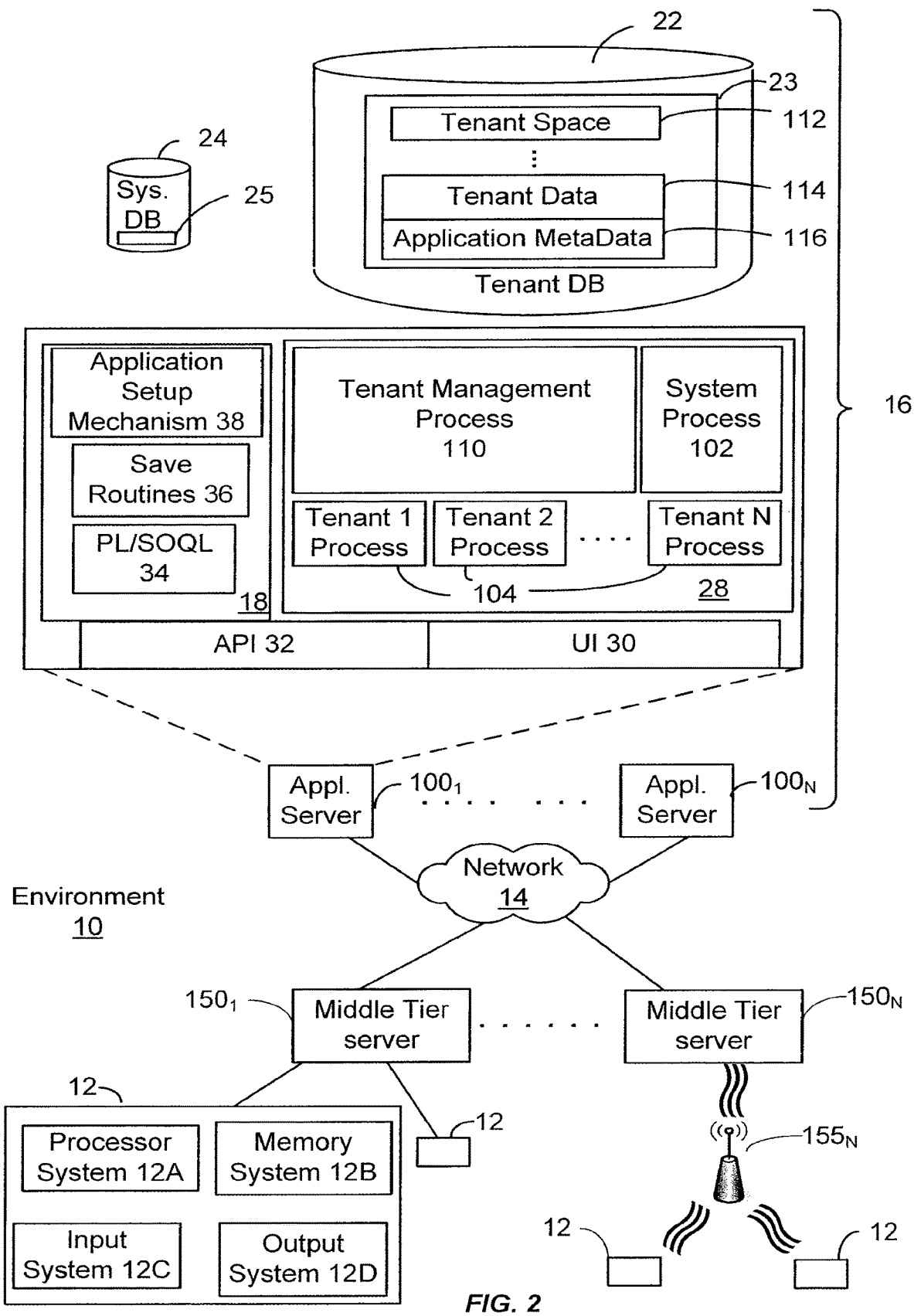
FIG. 2 illustrates a block diagram of an embodiment of elements of FIG. 1 and various possible interconnections between these elements.

FIG. 2 illustrates a block diagram of an embodiment of elements and various possible interconnections between these elements. In the embodiment illustrated by FIG. 2, one or more middle tier servers 150 exist between system 16 and user systems 12. Middle tier servers 150 are termed middle tier because these servers are interposed between the system 16 and the user systems of a particular organization. As described above, network 14 may be used for communication between system 16 and system 12. In one embodiment, the same network 14 is used between a middle tier servers 150 and user systems 12. In another embodiment, a different network is used between a middle tier server 150 and user systems 12. For example, a tenant network $155_N$ may be a wireless network, and network 14 may provide communicable coupling via fiber-optics. Each network 14 or tenant network $155_N$ may also be a combination of different types and protocols.

In one embodiment, each middle tier server 150 manages data of a different organization or tenant, however other embodiments may include information of more than one tenant coupled to a single middle tier server. In another embodiment, each middle tier server 150 may contain a plurality of servers, which collectively provide communication between system 16 and user systems 12 of an organization. The tenant network 155 of each organization may be of a different type (e.g. wireless, optical, . . . ) or protocol. Examples of wireless protocols include Wireless LAN, Global System for Mobile Communications (GSM), Personal Communications Service (PCS), D-AMPS, Wi-Fi, General Packet Radio Service (GPRS), 3G wireless systems such as those using Code division multiple access (CDMA), HIgh PErformance Radio LAN (HIPERLAN), and Worldwide Interoperability for Microwave Access (WiMAX).

Additionally, FIG. 2 further illustrates elements of system 16 and various interconnections. FIG. 2 shows that user system 12 may include processor system 12A, memory system 12B, input system 12C, and output system 12D. As shown in FIG. 2, network 14 couples user systems 12 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100$_1$-100$_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100$_1$ might be coupled via the network 14 (e.g., the Internet), another application server 100$_{N-1}$ might be coupled via a direct network link, and another application server 100$_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) and/or middle tier servers 150 communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will first describe a multi-tenant database table in accordance with aspects and embodiments of the present invention. Embodiments for pushing data to user devices 12 are then detailed. Following this, a framework for implementing pushing the data and examples of attributes of this framework is described.

Exemplary Multi-Tenant Database Table

FIG. 3 illustrates an example of objects stored in tenant data 23 represented as a main table 200 according to an embodiment. In the specific example shown in FIG. 3, the main table 200 (.account) represents a standard Account entity. As shown, main table 200 includes an organization ID ("org id") column 201 and a table ID (e.g., "acc id" for .account id) column 202 that acts as the primary key for table 200. Data table 200 also includes a plurality of data columns 203. Data table 200 may also include column 209 that stores the user ID of the user that owns or created the specific account that is stored in that row.

The org id column 201 is provided to distinguish among organizations using the multi-tenant account table 200. As shown, N different organizations have data stored in table 200. The org ids in column 201 are defined as Char(15) in an example implementation, but may include other data types. In one aspect, the first 3 characters of the org id is set to a predefined prefix, such as "00d", although another subset of characters in the org id may be used to hold such a prefix if desired.

In the specific example of FIG. 3, where the table represents a standard entity, data columns 203 are the predefined data columns, or standard fields, that are provided to the various organizations that might use the table. In the standard Account entity example, such standard fields might include a name column, a site column, a number of employees column and others as would be useful for storing account-related information. Each of the data columns 203 is preferably defined to store a single data type per column.

In an embodiment, evaluation of a sharing model controls which users can see which records. These embodiments can distinguish between users that can see many rows in an organization (e.g., bosses) versus users who can see very few rows (e.g., lower level employees). In one aspect, a sharing model allows even finer granularity of access to rows—in addition to the permission checks above. The administrator, when defining a custom entity type, can choose whether the entity type is editable by all users (Public Read/Write), read-only for all users (Public Read/Only), or privately available only to the owner of a record or to users who are granted explicit sharing access to a record (Private).

To support the sharing model, in one aspect, a standard owner field is added to the custom entity data table and becomes available in the API. The same semantics attached to the owner field in other standard entities apply. For example, managers in the role hierarchy gain access to all records owned by a subordinate. Also, a generic sharing entity, e.g., customEntityShare, is used in one aspect for entering manual explicit sharing access for particular custom entity rows to users or groups—in the same way that the accountShare entity is available in the API (and UI) to allow granting explicit account access.

Table 200 is an example of data that needs to be sent (pushed) to many users devices of potentially many organizations. Increasingly, these user devices will be small wireless devices, which pose additional difficulties.

Pushing Data

Remote devices or thin client devices such as Wireless Handhelds for example offer finite resources. Such devices have a limited amount of memory and processing power, and often times connect across a wireless network at speeds far below dial-up modem speeds. Techniques employed by example embodiments described herein can enable database systems to work with such constrained device environments by addressing what data is sent to the device, and when.

Accordingly, embodiments are suited for use with: devices with a small form factor, limited interactive capability, limited display size, limited memory or storage capacity, limited processing power and short battery life; and/or with networks that have/are not consistently available, slow data transfer rates, erratic data transfer services, and no consistent standards; with data having massive quantity and that is not organized for mobile users; with users that have short attention spans, no patience, are on the move, and are routinely in awkward or limited usage situations; and with managers who have security concerns and where applications, devices, and users require a new management layer.

In one embodiment, a communication model among the system 16, middle tier servers 150, and user devices 12 is based on a bi-directional transaction of data at an atomic level. This allows field level changes to be tracked between paired databases across a wireless network without the need for reliable and constant network connectivity. By implementing a transactional system that manages its own end to end delivery management, designed with store and forward methodology, the application and the user are shielded from the time, complexity and unreliability of the underlying transport mechanism.

Figure 4A:
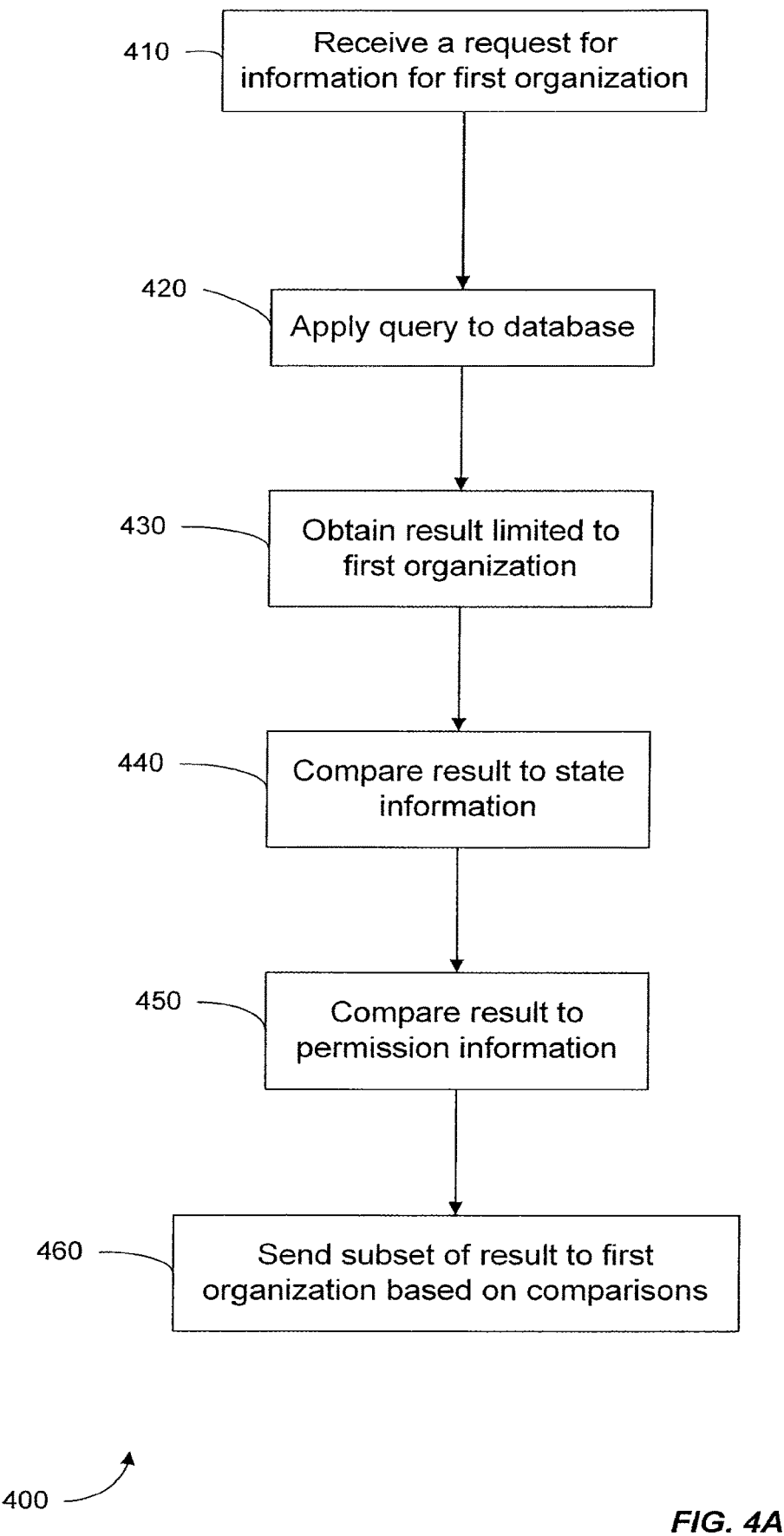
FIG. 4A is an operational flow diagram illustrating a high level overview of a technique for pushing data to a plurality of devices in an on-demand service environment in an embodiment.

FIG. 4A is an operational flow diagram illustrating a high level overview of a technique 400 for pushing data to a plurality of devices in an on-demand service environment in an embodiment. In an embodiment, the technique for pushing data to a plurality of devices in an on-demand service environment shown in FIG. 4A is operable with the multi-tenant database system 16. As shown in FIG. 4A, the process provides pertinent information to an organization, e.g. at a server, from a database that potentially contains information for a plurality of organizations.

Figure 4B:
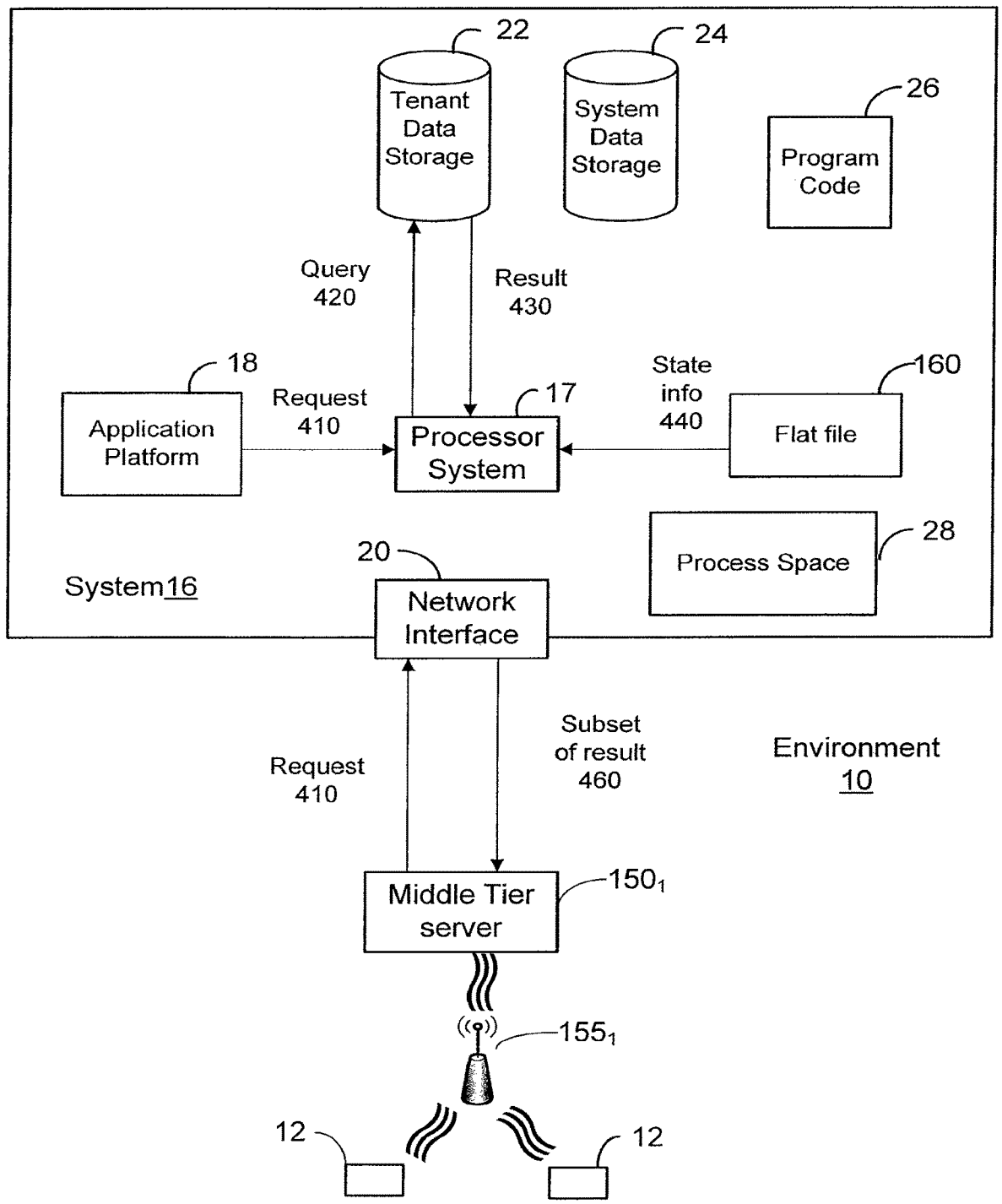
FIG. 4B illustrates the technique of FIG. 4A as it relates to an environment according to an embodiment.

At block 410, a request for information for a first organization is received. For example and without limitation, this can include a middle tier server $150_1$ of the first organization sending a request via network 14 to system 16. This step is shown in FIG. 4B, which illustrates technique of FIG. 4A performed in an environment 10 according to an embodiment. Alternatively, the request for information is generated internally to the system 16. For example, application platform 18 may send the request for information for the first organization to processor system 17.

The internal or external request may be responsive to a set of criteria. In one embodiment, if any one of these criteria are met then the request is sent. For example, one criteria is a predetermined time period, thus providing a scheduled update, such as, every 15 minutes a request is sent for information for the first organization.

At block 420, a query is applied to a database, where the query includes that the information is for the first organization. By way of example and without limitation, this can include instructions to processor system 17 querying tenant data storage 22, as shown in FIG. 4B. The query may have certain criteria, such as limiting data to the first organization, the first N contacts or other objects, objects with specific attributes, and data having a certain relationship to the specific data returned by the query.

At block 430, a result of the query is obtain where the result is limited to information associated with the first organization. At block 440, the result is compared to state information that indicates what information is present at a middle tier server $150_1$. By way of example and without limitation, this can include state information stored in a flat file 160, which may be a separate data storage or the same as any of the other storages mentioned herein. The state information tracks which data was previously sent to server $150_1$ and which data has changed since that data was sent.

At block 450, the result is compared to permission information that indicates which portion of the result that devices at the first organization are permitted to view. At block 460, based on the comparisons, a subset of the result is sent to middle tier server $150_1$.

In one embodiment, the entire result is sent, e.g., during an initial extraction. Certain criteria may be used to determine when an entire result is sent. These criteria include a reset condition, a change in rules for the information associated with the first organization, an edit made to a portion of the data, a request for the entire result by the server of the first organization, and a size of the subset of the result being larger than a predetermined amount. The edit to a portion of the data may come from an administrator of the first organization or just a user system of a device. In one embodiment, if the size of the subset is too large then a fault is sent to middle tier server 150, which then returns a request for an entire extraction.

In one embodiment, after the middle tier server 150 receives the subset of the result, server 150 can combine the subset with existing data in order to form a quasi-identical copy. In one aspect of an embodiment, this copy is quasi-identical in that it is not necessarily an exact match with the data on system 16. It may be up to date only with respect to the most recent push of data, which may, for example, one or more seconds or minutes in the past.

Sending Data to Client Device/Relevance Model

Once the middle tier server 150 has the new subset of data, it may send the entire subset to a user system 12, also called a device. Often the device will not be able to hold all of the data that is allowed to see. Accordingly, some embodiments use filters, criteria, relevancy rules, or certain events to determine which data to send to the device.

Additionally, in order to reduce the number of times the user needs to get information from the network because it is not available on the device, some embodiments put as much data as possible on the device in advance. For users who work with relatively small data sets, this is simple to achieve by just dumping everything onto the device.

However, in many instances the pool of possible data is in the range of hundreds to thousands of megabytes. So the challenge becomes to determine the best set of active filters to apply per user to that data set to ensure that for every user, the data on the device is highly relevant to the task they are currently performing. Accordingly, embodiments use a relevance data model. Relevance filters can be set based on, for example, user schedule, location, active customer list, open work order inventory, or any other number of job, time or individual specific criteria.

In one embodiment, the frequency and type of exchange is governed by mobile profiles and application-specific requirements. The mobile profile rules are set to match data flow to the capability of the target device and needs of the mobile user. Application specific rules are set to match the relevance of the data to the specific mobile user or user groups and the set of field tasks or jobs to be performed. A goal of the relevance-based rule set is to ensure that data from the enterprise application is delivered to the device ahead of when the user will need it.

A profile is the configuration of the mobilized application with the following exemplary purposes: Define the subset of data fields the user wants to see on the device; Filter the amount of data the user wants to have on the device; Store the business logic required to retrieve data using methods to add, delete, or update data through system 16.

The first two features are directed toward limiting the data brought down to the handheld device. On the limited display of a typical mobile device, the user might not want to see all the data fields available through their desktop account. That is, each data record will normally have many more fields than can benefit the mobile user. As an example, the user may want to see Name, Address, and Phone Number but not Department Code. Moreover, the profile provides a filtering process to select only data records matching specific constraints, such as a range of postal codes or date of last order.

The third profile feature provides a way to further describe processes related to each of the data management primitives for added generality. In this general way, the user or administrator can define the dataset to be maintained for the individual mobile user. Profiles are usually defined by role so one profile may apply to all major account salespeople, for example. Profiles can be changed, cloned or revised using very flexible console capabilities to achieve exactly the distribution of data most appropriate to the organization and individual users.

Figure 5A:
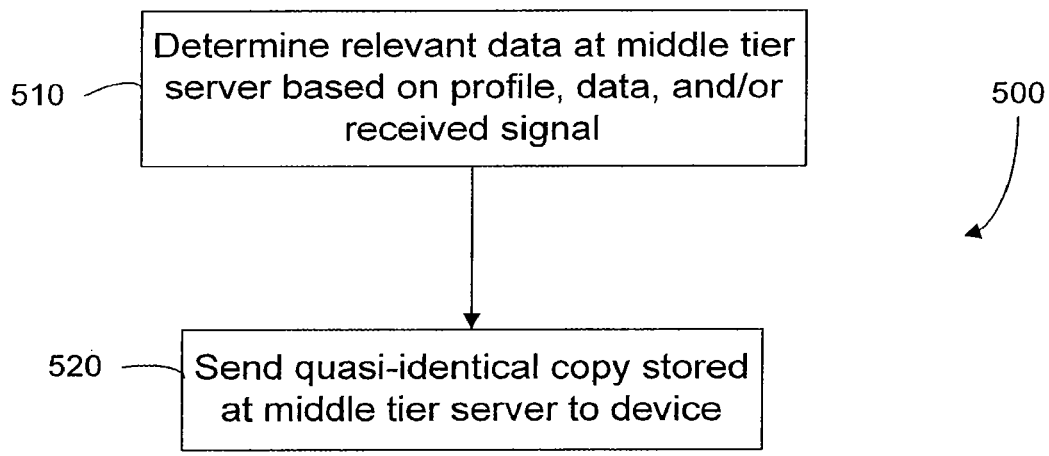
FIG. 5A is an operational flow diagram illustrating a high level overview of part of a scheduled process for sending data to a device in an embodiment.

FIG. 5A is an operational flow diagram illustrating a high level overview of part of a scheduled process 500 for sending data to a device in an embodiment. At block 510, the middle tier server determines the relevant data to send to the device based on a profile, data, and/or received signal. By way of example and without limitation, this data anticipation is achieved by using parameters that are highly application specific. For example, in a sales force automation (SFA) application where the user is a field sales representative, that users relevance parameters will likely focus on their scheduled meetings, active deals, proximate customers, and whatever other key parameters influence the pattern of what data they use most often on a daily basis. The user's enterprise application data set can then be actively and constantly examined against these parameters, and data can be constantly sent to, and removed from, the device to maximize the likelihood that the data on the device at any given instant is most likely to be the data that user needs to perform the task they are currently working on.

Figure 5B:
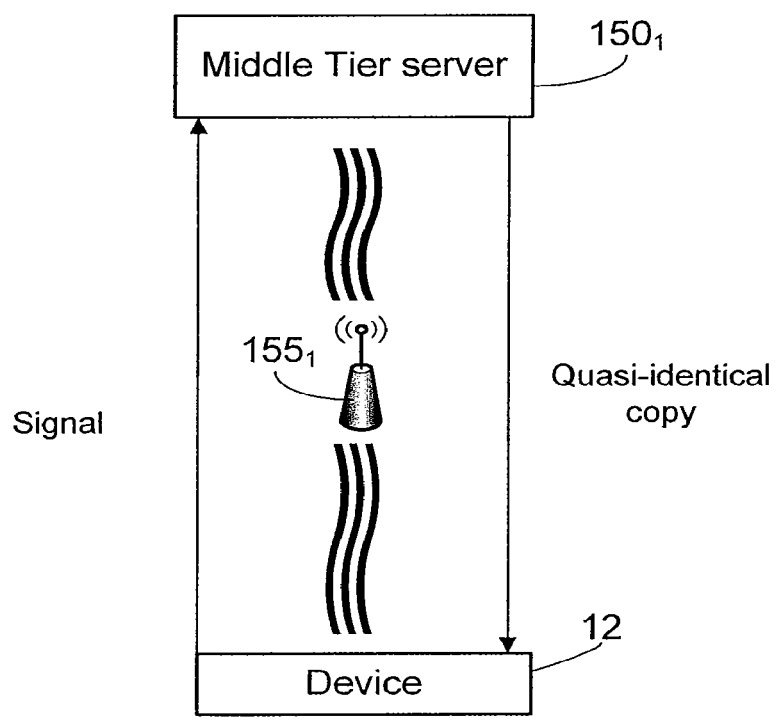
FIG. 5B shows a flow of data in a scheduled procedure for sending data to a user device in an embodiment.

In one embodiment, a signal is sent from device 12 to middle tier server 150, and the signal is used to determine relevant data. FIG. 5B shows a flow of data in a scheduled procedure for sending data to a user device in an embodiment. In one aspect of an embodiment, the signal is simply a request for particular data. The middle tier server 150 would then deem this data relevant. In another aspect, the signal is geographical information, such as a GPS signal, which may then be used to determine the relevant data. For example, based on the position of the user, data for contacts, which are in close proximity to the mobile user, may then be sent to the device 12. This data is related to information on the device, such as user information identifying the identity of the user. Additionally, embodiments provide integration with third party services such as Location Based Services (LBS), providing such features as auto provisioning the mobile device with customer locations that are within miles of the salespersons whereabouts, offering access to maps and directions to a customer site, etc.

In one embodiment, as the data is gathered for each user, it is sent through a change management process to determine what data is already contained, changed or deleted from the target device. Only data which has actually been changed or added is then sent down to the device in an atomic transaction format. This data is deposited into the user's transaction queue on the middle tier server 150. At this point data can optionally be compressed in order to minimize wireless bandwidth requirements.

Figure 6A:
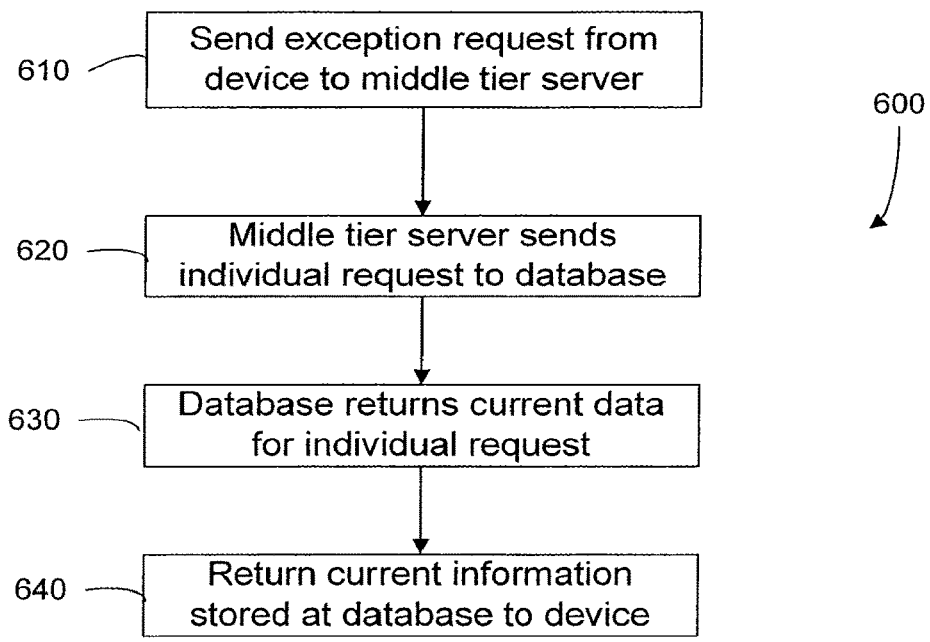
FIG. 6A is an operational flow diagram illustrating a high level overview of an exception process 600 for sending exact identical data to a device in an embodiment.

However, there may be instances where the user device wants to ensure that it has the exact data and not a quasi-identical copy. FIG. 6A is an operational flow diagram illustrating a high level overview of an exception process 600 for sending exact identical data to a device in an embodiment. At block 610, an exception request is sent from the user device to the middle tier server. By way of example and without limitation, the exception request may be sent by a user activating an override process such that a query is sent to the database in system 16. In another embodiment, the exception request may be generated by the system 16 or server 150 in response to a data edit with or without particular characteristics. At block 620, the middle tier server sends an individual request to the system 16. The request is individual in that it is not for the entire set of user devices associated with that particular middle tier server, but for a particular user device. An individual request may also be for a small group of the devices. At block 630, the system 16 returns the current data for the individual request. In one embodiment, only the changes associated with that individual request are sent. In another embodiment, all of the resultant data are sent. At block 640, the current information from the database is sent to the device.

Figure 6B:
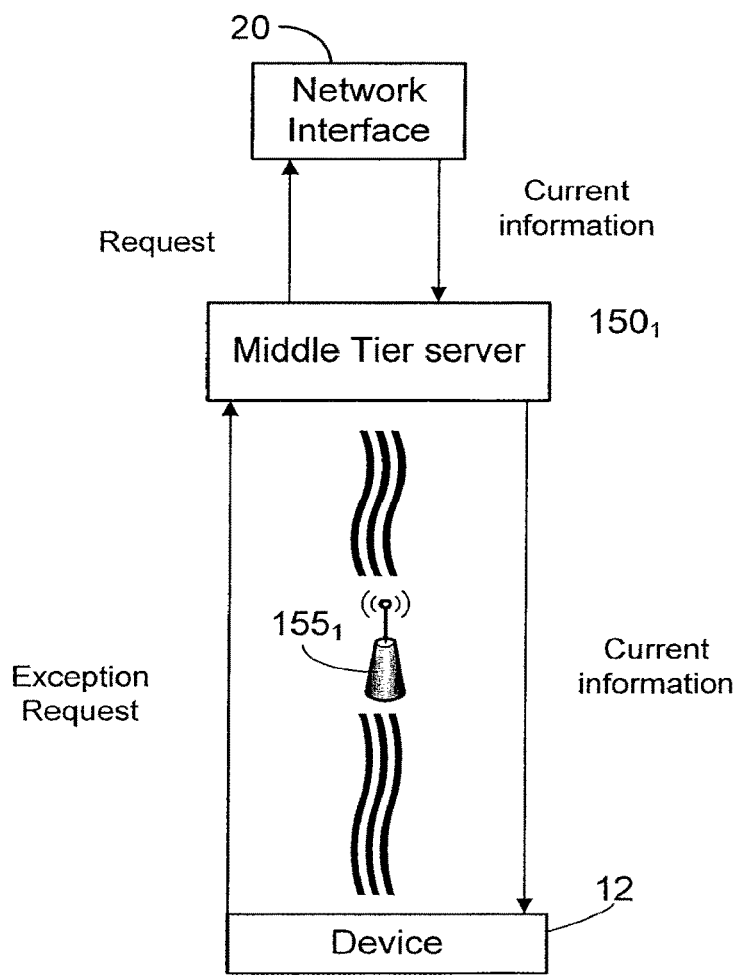
FIG. 6B shows a flow of data in an exception procedure for sending data to a user device in an embodiment.

FIG. 6B shows a flow of data in exception procedure 600 for sending data to a user device in an embodiment. The exception request is sent from device 12 to the middle tier server 150 via a wireless network. As one can see, the additional step of sending the request to the system 16 (not shown) through network interface 20 is performed in comparison to the scheduled process 500. The current information is then sent though the middle tier server 150 to the device 12.

Figure 7:
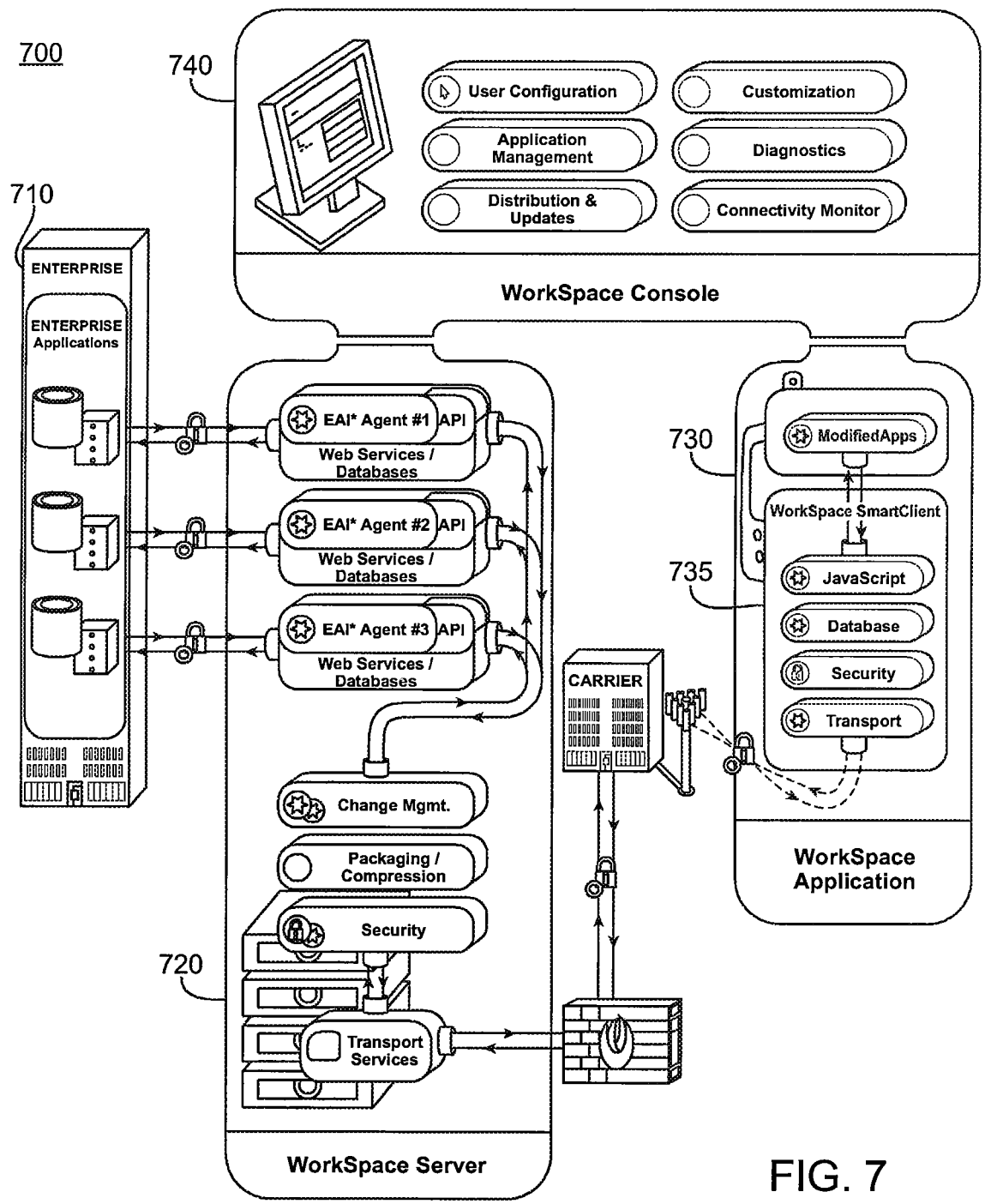
FIG. 7 shows a wireless workspace according to an embodiment.

FIG. 7 shows a wireless workspace 700 according to an embodiment. The enterprise applications run on an enterprise system 710, such as system 16. Workspace server 720 acts as a middle tier server between enterprise system 710 and the workspace application 730, which is running on the user device. A console 740 is use to configure the workspace server 720.

SmartClient

In one embodiment, the client device application (SmartClient) 735 has four main components residing on the mobile device: database engine; transport protocol; user interface; business logic. The database engine and transport protocol, along with other support components, are part of the wireless workspace platform referred to as the SmartClient component. The SmartClient performs data synchronizing functions with server in the background.

To achieve local data independence of the network, the workspace architecture includes the SQL database engine running on the device. This is connected to the Transport, a process that is always running in order to send/receive updates bi-directionally with the server 720.

In one embodiment, the database engine implements a native instance for each kind of platform. In one aspect, the database is restricted to the minimal SQL functionality required for the infrastructure in order to maximize its performance. The database design follows the same generic philosophy across different platforms, even if the implementation is quite different, using the specific features offered by the operating system of each different platforms. In one aspect, the Transport implements TP4 on the top of the proprietary wireless protocol and/or standard protocols like HTTP or TCP as may be available on the mobile platform.

In one embodiment, the SmartClient is a generic application framework that is fully data-driven in its user interface (UI). Schemas are created on the Server to completely describe the pages and UI for any application. The schema is transferred to the mobile device and is utilized by the generic SmartClient to mobilize the underlying application.

A unique rendering engine, in the data-driven Smartclient, displays the mobile user interface without custom programming Schemas can be hand coded, but also generated by the discovery of the objects and authorized data via a Web Services interface. This is termed a self-describing, data driven architecture. Any custom objects defined in the construction of a native application may be immediately available to the workspace mobile user. All that is required is to define the application-user association using the console 740. This may be generalized to other environments as they become available.

In an embodiment, the application itself defines the business logic and how to display the data. All data operations are performed relative to the local database. If new information is generated on the device and needs to be pushed back to the application data source, the client application invokes the Transport. Requests are queued for transmission and Transport manages the transaction to a successful completion, even if there is a delay due to network unavailability or transmission errors.

WorkSpace Server

In one embodiment, workspace server 720 is the component responsible for: detecting changes to data on application data source, providing new data to the device, pushing new data generated/processed from the device to the application data source, guaranteeing that the communication is reliable, secure, and/or available for different platforms.

A central functionality of the multi-layer workspace server 720 resides in a module called workspace server core services. It is carrier network, mobile device, transport protocol, and application independent. This module periodically checks for updates against the application data source, performs a delta analysis to determine changes in application data or layout, moves changed data to the mobile device subject to the stored user profile, moves changed data from the mobile device to the application data source, handles service requests from the population of mobile devices, performs translation and normalization of data moving through the server, performs encryption/decryption as needed in support of the workspace security model.

In one embodiment, after an initial data load to start the user off, on a scheduled basis workspace server 720 retrieves for each user: any new data from the application data source (using the related EAI agent), and the profile associated with the user (from the console database via workspace web services). After applying any filters defined in the profile, the workspace server then queues the data for transmission to the device by requesting the workspace transport services to invoke the correct transport agent. New data coming in from the mobile device is used to update the application data source according to syntax defined in the user's Profile.

In another embodiment, to enhance the security of the overall system, the username and the password of the users' accounts are not stored anywhere outside of the mobile device. On the device, the credentials are encrypted. At a configurable interval, the mobile device sends an update request to the server containing the username and password. The server 720 retrieves the user's data from system 710 over an SSL encrypted link along with the account layout information. Server 720 checks for new data since last time an update was requested, compares only hashes of the data, not data itself. If a change is detected, only the changed data is sent to the mobile device. In one aspect, all caches are flushed and no user data enters persistent storage.

When the server 720 contacts enterprise system 710 to retrieve data, it may also retrieve the personalized layout associated with the individual user. The layout is compared to the information stored on the console 740 and the server 720 builds and maintains a "schema", a specific description of the data and permissions, which is also sent to the device. In this way, the data-driven SmartClient will modify its behavior based on changes the user makes to his account from the desktop.

The data table called the "schema" also may describe the pages and user interface layouts to work wirelessly with any application. In one aspect, this schema table is always kept synchronized with the wireless device. The SmartClient will see the same set of applications that a user sees if using a web browser to access the enterprise applications at the desktop. Management capabilities and security controls are added to permit the administrator to determine which mobile user has access to what applications.

In one embodiment, the meta-data that describes all supported objects, their associated fields and syntaxes, as well as the configured page layouts are all available via the DESCRIBE API method. DESCRIBE is used by the server 720 to automatically generate the schema table for use by the SmartClient. Therefore, any object that is part of a user's account can automatically be discovered and made part of the mobile layout and dataset. On the device this will take the form of things as simple as an extra field or two in a record or it could be a new tab on the main page with a complicated set of objects underneath. Additionally, any time the meta-data changes, due to design changes by the user or the developer, the change can be automatically discovered, and the schema rebuilt and propagated to the wireless device so application changes and customizations are updated for SmartClient users.

WorkSpace Console

In one embodiment, each supported mobile application has customization and configuration capability exposed through workspace console 740, enabling a purpose-built mobilization of an enterprise application. These functions are typically employed during the initial setup phase of the mobile application and rarely change afterwards. This part of the process requires default or advanced configurations to be developed where mobile profiles and user parameter sets for those profiles are built for the enterprise application.

The management console 740 provides a broad set of over-the-air administrative capabilities, for the deployment, monitoring and remote control of workspace applications. It enables policy driven security models including role and functionality based access controls, secure lockdown of applications on compromised devices, mobile application auto-logout settings, diagnostics and troubleshooting capabilities. Application specific capabilities include on-the-fly customization and configuration, either before or after deployment, in addition to application usage reporting.

The console administrator can organize and manage users across multiple domains and organizations. These groups which can be used to manage multiple companies, or multiple groups within a company. From there, administrators can manage individual mobile users by add/edit/enable/delete/search functions. The console can also manage the user data, change the security settings and perform the diagnostic tests for a user.

The console 740 offers a suite of secure services that allow the status of any device to be tracked in the field and actions performed on the workspace applications running on the device. This includes actions such as logout, erase data, update password/login credentials, control certain functionality, reload data, etc.

In one embodiment, the monitoring systems include a number of critical elements including log/event/trace data, alert configuration and responses. In one aspect, the monitoring services present information to the administrator on: connection status (e.g., is the wireless user connected to the system?); data queue (e.g., is the server trying to send data to the user?); flow control state (e.g., is the user receiving and acknowledging the datagrams?); trace-Points (e.g., when was the last time we had successful exchange of data?); and traffic profile (e.g., how much data has been exchanged with the device and the server and is it within normal limits?).

Once an application has been deployed to the field and is being actively used by its mobile user community it rapidly becomes a mission critical enterprise resource. The ability to keep the solution running smoothly with minimal disruption becomes very important very quickly. The workspace console 740 facilitates this requirement with state-of-the-art diagnostics and troubleshooting modules. When problems arise in the field, the administrator can be quickly notified and quickly diagnose, localize and correct the problem.

In one embodiment, the diagnostics module provides the following tools to ensure timely resolution of problems. For example, context sensitive alerting mechanism ensures that the administrator know precisely what area of functionality needs attention. Comprehensive log data with hierarchical displays, search functions and filters allow the problem to be pinpointed and a diagnosis process initiated. Access to test & diagnostic functions built into each layer of the server is provided so that firewall, network configuration and system resources issues can be tested. End-to-end information tracking is enabled via intelligent log & trace parsers that can pinpoint any information exchange with the wireless device and provide detailed delivery path information to the administrator.

Additionally, console 740 allows administrators to create sub-organizations so that users can be logically grouped in different sets, perhaps by company division or geographical organization. Users can be moved across organizations, and any depth of hierarchy can be maintained. Also, an important feature managed through the console is the account profile.

In one embodiment, many of the configuration steps are automated. For example, a console plug-in asks for a valid account. Given the account and password, the plug-in will discover and retrieve the permissions (what is visible) for that user and the default layout.

The console administrator can decide to modify what the user is going to see since the needs of a mobile user may differ from a desktop user. Tabs representing objects can be hidden in the wireless profile, or simply can be made non-editable for the wireless application. The administrator can also set the data filters to limit the kind and the amount of data stored on the device. For a typical account, the SmartClient database engine running on the device can store up to 60,000 records (limited by device memory). This is a huge amount of data, but some accounts may have even larger datasets or users may find too much data to be unworkable for them. Therefore, for each object, it is possible to write a SQL-like statement that filters the data, with many different constraints (record matching some date, numeric values, owner, strings, etc) to find a practical balance representing a highly useful but manageable set of data. In one embodiment, once the filter is set, the actual content of the dataset is dynamic, created on the fly by the server 720 according to how the current data passes the filter in the profile.

Initialization and Use of the Device

In one embodiment, the user devices get provisioned with software over-the-air (OTA) in a smart boot-strap process. After that initial OTA framework installation, the entire system runs wirelessly, from system upgrades to data recovery, and everything in between. On a handheld device, there are one or many applications that the wireless user uses to perform their job. After that user logs in to the application, they use it as needed to perform their job, view, changing and using data available from the local database. If anything the user needs is not available locally, it can be fetched automatically or at the user's request wirelessly in the background, and shows up inside the application in the relevant place when it is available. The wireless user need not pause, wait or stop working while the transactions occur wirelessly so they continue to use the application normally.

In one aspect, in addition to taking advantage of the carrier and device vendor over-the-air (OTA) services, a rich set of OTA management and application deploy functionality specifically designed to work within the workspace environment. This allows the mobile application administrator to deploy new applications and apply updates and patches to already running applications, without the need to ever cradle the mobile device or detract from the user's day-to-day productivity. Bug fixes and functionality changes can be deployed to a large, dispersed mobile workforce in a very short time.

In some embodiments, all data updates sent from the server 150 to devices 12 are independently acknowledged over the reliable transport protocol, making it possible to track each update individually and each update happens in the expected sequence. In the opposite direction, messages are sent from device 12 to server 150 over the same reliable transport protocol. Actions that modify data on the device are tentatively updated on the device local data store, sent to the server, received by the agent that is responsible to commit the data to the enterprise application. In one aspect, if the data commit is unsuccessful, that error is reported back to that device, which will undo the previous tentatively stored information. This can ensure data integrity between the server 150 and the device 12.

In an embodiment, on the wireless device 12, a workspace SmartClient runtime environment renders the native application UI and manages the interface for the user. As the user uses the on-device data, any changes, updates or deletions are queued in the on-device transaction queue for transmission back to server 150 at the earliest possible time. In this way, data flows freely back and forth while there is available wireless coverage, and handles even extremely extended periods of no wireless coverage seamlessly for the end user, who can continue to use the application uninterrupted.

Impact of Local Data

In one embodiment, with a wireless workspace, the device may or may not be connected but pre-positioned information is always accessible to the user. Rather than have the user wait for a connection and completion of data, transfer, the data is already on the device, ready for local access whenever requested. That is, the database executes on the device even when the application is turned off, communicating periodically with the change management module of the Server. If fresh data is available, the user always receives the latest changes.

Symmetrically, any changes made by the user are pushed upstream to the Server at the first opportunity. The user can work just as if using the business application on the desktop. Every time an operation affects the data, the new data is pushed to the workspace server 720, which forwards it to the application data server. In one aspect, this happens immediately if the wireless connection is available, or, in the absence of a connection, data is queued and the update performed as soon as the connection is available again.

In another embodiment, on the workspace server 720, there is a cyclic check for new data on the application server. If a change is detected, it is transferred to the mobile device without user intervention, guided by the user's profile. Data transfer in either direction is atomic, at the field level, minimizing the use of bandwidth and battery on the handheld.

A key point is that the user is not involved in management of the data, the connection, or the status of the network. The application user creates or reviews local data, guided by the graphical user interface (GUI) and business logic, but is insulated from how the data is transmitted, managed, stored or secured. The Sendia platform makes these functions and issues transparent, a qualitative change in the user's experience and dramatic improvement in the value of the application.

Rapid Application Evolution

In one aspect, workspace 700 changes the paradigm by providing an architecture that anticipates and adapts to change Details such as the design layout, data fields and their usage, and business logic are defined in profile or in the metadata of the application itself, exposed by its web services or other API. The components of the workspace pluggable architecture auto-discover such changes and propagate the deltas to the universal SmartClient, all done over-the-air and without user involvement. Just as you may visit a website and find that it has changed since your last visit, the mobile workspace user may notice incremental changes as the application evolves to meet business needs. But the user is not required to take any action or manage the process. In this way, user satisfaction with the application is increased and the total cost of ownership (TCO) of the complete system life cycle is reduced.

In one embodiment, major changes to the application are all accomplished by creating new plug-ins for the elements of the workspace affected. These encapsulated modules, interoperating through well-defined web services protocols, can be easily and rapidly changed on server 720 with no disruption of the mobile users. In one aspect, application changes typically do not involve re-provisioning of the SmartClient, only propagation of new meta-data over the air. If a new version of the SmartClient platform itself is needed, that too is sent over-the-air. Once received by the handheld device, SmartClient self-installs. The users and their devices never have to be brought to a central location, never have to be cradled or cabled to a desktop.

Privacy and Security

In one embodiment, workspace server 720 has full path encryption and access controls on every component. The workspace server 720 also may not store unencrypted user data or passwords in any form. In one aspect, administrators have no access to the user's data or account password. Only the user can unlock the application with their own password and no password is ever persistently stored in clear text form.

Privacy and security features of workspace 700 may be administered through the console 740. The designated administrator has a high degree of control over the actions of users and their rights to data. For example, in the event of a lost or stolen device remote operations are available to wipe data from the device and delete the application.

WorkSpace SmartLoader

In one embodiment, deployment of workspace 700 involves associating a user with the application through the console 740 and providing a copy of the SmartClient software to the user's device. Multiple ways are provided to accomplish this, based on a general framework that is easily adapted to new devices that will surely come to market. For example, the application can be loaded on the mobile device via cables and desktop-to-device software provided by the manufacturer. This is labor intensive and can be unmanageable for the support department if some or all of the users in the field already have their devices.

To make it unnecessary for the devices to ever have to be brought in for loading, Wireless Workspace provisioning normally takes place over the air (OTA). The OTA process starts with a text message or email to the device. At a convenient time, the user clicks on a link in the message to start downloading the application. In one aspect, the process is wireless and automatic, eliminating any need to return devices to the support center in order to install the application.

In one embodiment, the first component downloaded is a workspace smartloader, a platform-dependent component. The smartloader auto-discovers information about the local mobile device and operating system, then connects to a specific console servlet (e.g. a server-side application connected by an external request broker). The smartloader retrieves the specific binaries for the target mobile platform. In one aspect, in case of multiple applications installed on the device, smartloader avoids downloading duplicates of the same component.

Upon completion of the download, the device is reset and the user can log in to the application. The initial login includes establishing the user's credentials (user name/password) which are checked against the source, application for validity. Thereafter, the same credentials are required for further access to the application, although the user can request a password change when needed.

Any of the software components or functions described in this application, may be implemented as software code to be executed by a processor using any suitable computer language such as, for example, Java, C++ or Pert using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, along with a processor which can execute instructions on the computer readable medium, and may be present on or within different computational apparatuses within a system or network.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for pushing data to a plurality of devices of an organization, comprising:
   receiving, at a middle tier server between a database system and the plurality of devices, a plurality of requests for data from the database system, the plurality of requests being for two or more of the plurality of devices associated with a first organization, the database system containing data for multiple organizations, including the first organization;
   transmitting, by the middle tier server, the plurality of requests in bulk and instructions limiting the query to data associated with the first organization to the database system over a network connection;
   receiving, by the middle tier server, results for the plurality of requests from the database system over the network connection, the received results being for every one of the transmitted plurality of requests;
   filtering, at the middle tier server, the received results for information relevant to each device of the two or more devices, the filtering being based on:
      a profile associated with the corresponding device of the two or more devices, the profile defining a data amount based on the capabilities of the corresponding device including the amount of memory, processing power and device size, and rules to match the relevance of the data to the user of the corresponding device, and
      a signal sent from the corresponding device that is used by the middle tier server to determine information relevant to the device, the signal including geographic information related to information on the corresponding device; and
   transmitting, by the middle tier server, the filtered results to the two or more devices over a different network connection, without the two or more devices contacting the database system, the two or more devices each receiving filtered results that include the information relevant to each device.

2. The method of claim 1 wherein, the received results are updates to a prior result.

3. The method of claim 1, further comprising:
   periodically checking, by the middle tier server, the database system for updates;
   performing a delta analysis, by the middle tier server, to determine changes in application data and layout; and
   moving, by the middle tier server, changed data to a device subject to a stored user profile associated with the device.

4. The method of claim 1, the filtering further comprising, for a device:
   comparing the determined relevant data to previously sent data from the middle tier server to the device; and
   sending the determined relevant data to the device over the different network connection when the comparing shows that the determined relevant data is changed or added to the previously sent data from the middle tier server.

5. The method of claim 1, further comprising:
   creating, by the middle tier server, a schema describing pages and a user interface (UI) for an application associated with the results; and
   sending, by the middle tier server, the created schema to a device of the plurality of devices, the schema being used to mobilize the application associated with the results, thereby providing a self-describing mobile framework.

6. The method of claim 5, the schema comprising a data table that describes pages and user interface layouts for the device, the schema being synchronized with the device periodically.

7. The method of claim 1 wherein the middle tier server contains data for only a first organization.

8. The method of claim 1 further comprising:
   before transmitting the results to the plurality of devices, combining the results with existing data stored on the middle tier server; and
   transmitting the combination to at least a subset of the plurality of devices.

9. The method of claim 1 wherein the results are compared to a state information file tracking what data has previously been sent to the middle tier server and which data has changed since the previously sent data was sent, the results comprising only the changed data.

10. The method of claim 9, wherein the results are further compared to permission information, the results comprising only changed data that the plurality of devices has permission to view.

11. The method of claim 1, further comprising:
    moving, by the middle tier server, changed data from a device of the plurality of devices to the database system;
    handling, by the middle tier server, service requests from the plurality of devices;
    translating and normalizing data moving through the middle tier server; and
    performing encryption and decryption in support of a workspace security model.

12. The method of claim 1, further comprising:
    retrieving, on a scheduled basis by the middle tier server, new data from the database system using an enterprise application integration (EAI) agent on the middle tier server;
    retrieving a second profile stored on the middle tier server, the second profile including a user profile comprising security filters;
    applying the security filters to the results; and
    queueing the filtered results for transmission to a device of the plurality of devices by requesting workspace transport services on the middle tier server to invoke a transport agent.

13. The method of claim 1, further comprising transmitting, by the middle tier server, new data received from a device of the plurality of devices to the database, the new data having syntax defined by a user profile.

14. The method of claim 1, further comprising propagating a change in an application that displays the results on a device of the plurality of devices, the application running on the device, the propagating comprising:
    receiving, by the middle tier server, changes to the application;
    creating, by the middle tier server, a new plug-in associated with the application that includes the received changes; and
    transmitting the new plug-in to the device as metadata to the application running on the device.

15. A non-transitory machine-readable medium carrying one or more sequences of instructions for pushing data to a plurality of devices of an organization, which instructions, when executed by one or more processors of a middle tier server communicatively coupled between a database system and the plurality of devices, cause the one or more processors to carry out the steps of:

receiving a plurality of requests for data from the database system, the plurality of requests being for two or more of the plurality of devices associated with a first organization, the database system containing data for multiple organizations, including the first organization;

transmitting the plurality of requests in bulk and instructions limiting the query to data associated with the first organization to the database system over a network connection;

receiving, by the middle tier server, results for the plurality of requests from the database system over the network connection, the received results being for every one of the transmitted plurality of requests;

filtering, at the middle tier server, the received results for information relevant to each device of the two or more devices, the filtering being based on:

a profile associated with the corresponding device of the two or more devices, the profile defining a data amount based on the capabilities of the corresponding device including the amount of memory, processing power and device size, and rules to match the relevance of the data to the user of the corresponding device, and a signal sent from the corresponding device that is used by the middle tier server to determine information relevant to the device, the signal including geographic information related to information on the corresponding device; and transmitting the filtered results to the two or more devices over a different network connection, without the two or more devices contacting the database system, the two or more devices each receiving filtered results that include the information relevant to each device.

* * * * *